(12) United States Patent
Ratakonda et al.

(10) Patent No.: US 8,160,130 B2
(45) Date of Patent: *Apr. 17, 2012

(54) SYSTEM AND METHOD FOR THE DYNAMIC RESOLUTION CHANGE FOR VIDEO ENCODING

(75) Inventors: Krishna C. Ratakonda, Yorktown Heights, NY (US); Ashish Jagmohan, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 1201 days.

This patent is subject to a terminal disclaimer.

(21) Appl. No.: 11/931,512

(22) Filed: Oct. 31, 2007

(65) Prior Publication Data

US 2008/0063054 A1  Mar. 13, 2008

Related U.S. Application Data

(63) Continuation of application No. 10/767,597, filed on Jan. 29, 2004, now Pat. No. 7,352,808.

(51) Int. Cl.
*H04N 7/12* (2006.01)
*H04N 11/02* (2006.01)
*H04N 11/04* (2006.01)

(52) U.S. Cl. .......... 375/240.01; 375/240.02; 375/240.26

(58) Field of Classification Search ............. 375/240.01, 375/240.02, 240.26
See application file for complete search history.

(56) References Cited

U.S. PATENT DOCUMENTS

| | | | |
|---|---|---|---|
| 5,805,222 A | 9/1998 | Nakagawa et al. | |
| 5,995,151 A | 11/1999 | Naveen et al. | |
| 6,025,880 A | 2/2000 | Nakagawa et al. | |
| 6,625,322 B1 | 9/2003 | Kondo et al. | |
| 6,628,713 B1 | 9/2003 | Kojima et al. | |
| 6,937,771 B2 | 8/2005 | Kondo et al. | |
| 7,177,358 B2 | 2/2007 | Inomata et al. | |
| 7,313,283 B2 | 12/2007 | Kondo et al. | |
| 2002/0064226 A1 | 5/2002 | Bauer et al. | |

FOREIGN PATENT DOCUMENTS

| | | |
|---|---|---|
| EP | 0708564 | 4/1996 |
| JP | 9271026 A | 10/1997 |
| JP | 10304381 A | 11/1998 |
| JP | 11317951 A | 11/1999 |
| JP | 2000134615 A | 5/2000 |
| JP | 2001359096 A | 12/2001 |
| JP | 200216923 A | 1/2002 |

OTHER PUBLICATIONS

Letter from IBM Japan which indicates that the date of the issued Japanese Office Action is Feb. 15, 2011.

*Primary Examiner* — Christopher S Kelley
*Assistant Examiner* — Chikaodili E Anyikire
(74) *Attorney, Agent, or Firm* — Scully, Scott, Murphy & Presser, P.C.; Daniel P. Morris, Esq.

(57) ABSTRACT

The present invention relates to a method, system and computer program product for the predictive encoding of digital video sequences. The objectives of the invention are accomplished by dynamically determining the resolution of a current frame being encoded and outputting the determination. The determination process is based on statistical and coding information of a plurality of frames, including at least one previous frame and the current frame. Further, general encoding parameters and the encoding parameters of a current frame at a chosen resolution are determined, wherein the encoding parameter selection step takes into account the determination of the dynamic resolution determination step in determining the encoding parameters.

14 Claims, 7 Drawing Sheets

SYSTEM AND METHOD FOR THE DYNAMIC RESOLUTION CHANGE FOR VIDEO ENCODING

CROSS-REFERENCE TO RELATED APPLICATIONS

The present invention is a continuation application of co-pending U.S. patent application Ser. No. 10/767,597.

FIELD OF THE INVENTION

The present invention relates to digital video encoding generally, and more particularly to digital video encoding in which dynamic resolution switching is used to predictively encode a digital video bitstream.

BACKGROUND OF THE INVENTION

Video encoding algorithms are typically constrained in the total bitrate allowed (as is the case for variable bitrate video) or in the average bitrate allowed (constant bitrate video) for encoding the video stream. Thus, a video encoder cannot use a large number of bits (i.e. appreciably larger than the average bitrate) to encode each of a long sequence of successive frames. For example, for the case of constant bitrate video, a finite buffer, present at the decoder, is used to store encoded frames before they are displayed. In this case, the maximum number of bits that can be used to encode the current frame is bounded. This is because if a frame uses too many bits the decoder buffers can underflow, leading to a situation where the decoder has to delay or drop future frames.

The encoder controls the number of bits used to encode a frame by appropriately selecting encoding parameters such as the quantization scale. If the number of bits available for encoding the current frame is low, the encoder uses a high quantization scale to reduce the bitrate used for encoding the frame. However, if too high a quantization scale is used to encode a frame unnatural artifacts appear when the frame is reconstructed at the decoder. Depending on the magnitude of the quantization scale used, these artifacts may cause an appreciable loss in the perceived quality of the video stream.

Dynamically reduced resolution can be used, as an alternative to using a high quantization scale, to lower the number of bits used to encode a frame. Reduction in the resolution of a frame prior to encoding (termed reduced resolution mode encoding) allows the frame to be encoded in a lesser number of bits as compared to the original. The MPEG-4 video standard, for example, provides a reduced resolution mode, which can be used to encode video frames at a low bitrate.

Encoding at a reduced resolution is preferable to encoding at a very high quantization scale, from the point of view of perceptual quality of the reconstructed video frame. The reason being is that encoding at a reduced resolution causes uniform blurring as opposed to the characteristic blocky artifacts caused by encoding at too high a quantization scale. However, deciding when to encode at reduced resolution is not straightforward. Often, encoding at moderately high quantization scales may produce reconstructions of better quality than if reduced resolution were used. This is especially true when the spatial and temporal complexity of the frame is not high enough to mask the effects of reduced resolution. Thus, it is inadvisable to encode frame sequences with little motion at low resolution.

Another significant issue is that of the temporal distortion caused by encoding successive frames at different resolutions. Repeatedly switching resolution modes is inadvisable, it may be better to use the same resolution mode as preceding frames even if it provides inferior reconstruction for the frame on a stand-alone basis. It is therefore imperative that any resolution selection method ensures that reduced resolution is only used when it can be suitably masked and that resolution modes do not switch repeatedly in a short duration.

An example of an encoding method aimed at selection of a judicious resolution mode for encoding a particular image in a sequence of images is disclosed in U.S. Pat. No. 5,262,855. In this prior-art system (FIG. 1), the encoder encodes a frame at a lower resolution if it detects complex motion, fade and dissolve conditions, high quantization scale or high estimated decoding time. The prior-art system suffers from the following limitations: It switches to a reduced resolution mode if any one of the above-mentioned conditions occurs. Hence the presence of fast motion in the video stream would cause the encoder to switch to low resolution even if the decoder buffer level is high (for the case of constant bitrate video discussed above). Thus, considering the above conditions individually in selecting the resolution, this technique is not adequate because a function that embodies a combination of the above conditions is required. A second limitation of the above-mentioned system is that it does not address the problem of temporal distortion caused by switches in the encoding resolution. Since the system does not take the resolution mode history of previous frames into account, there is a significant possibility that the encoder may oscillate between different resolution modes.

An example of an encoding apparatus aimed at the design of a resolution selection controller is disclosed in U.S. Pat. No. 5,805,222. In this prior art system, the quantizer step size, amount of data coded and buffer occupancy of a previous frame are employed to select the resolution of the current frame being encoded. However, this system has the following limitations: The prior-art system uses statistical information from only one previous frame to make the resolution selection decision. However, it is known that accurate estimation of statistical information of a video bitstream requires incorporation of statistics over a plurality of frames. Estimating such information from just one previous frame is liable to be inaccurate since video frames typically exhibit diverse statistical behavior Further, many video effects such as gradual scene changes, which have important ramifications on the encoding resolution selected, can only be detected by studying the statistical behavior over several successive frames.

Further, the prior-art system embodied in U.S. Pat. No. 5,805,222 (as illustrated in FIG. 2) does not consider the amount of motion present, while selecting the encoding resolution. The encoding resolution selected should depend on the presence (or absence) of motion, since motion effectively masks the blurring distortion present in low resolution video. In the absence of motion, it is advisable to avoid coding at low resolution, since it causes visually perceptible distortion. The prior-art system uses the amount of coded data, in lieu of a motion estimate, in selecting the encoding resolution. However the amount of coded data is a poor estimate of motion. For example, a frame in a still scene may, nevertheless, have a large amount of coded data, if the immediately prior frame (with respect to which the current frame is predicitively encoded) was coded poorly. Thus the prior-art system may code low motion sequences at low resolution causing appreciable distortion.

When the statistical information of the current (and future) frames is not considered, the system is vulnerable to estimation errors. This occurs, for example, when the current frame marks a scene change. When the current and previous frames belong to different scenes, the statistical behavior of the previous frame is not a good indicator of the advisability of encoding the current frame in low resolution mode. Certain encoding algorithms employ a look-ahead estimation of the statistics of future frames, which may be used to circumvent the described problem. Further disclosed in the prior art is a function of a product of the amount of data being coded, wherein the quantization scale is used to switch from high resolution mode to low resolution mode as well as from low resolution mode to high resolution mode with different preset thresholds. However, the use of the same function for both modal resolution decisions is not adequate.

The switch from high resolution to low resolution mode should be done when the number of bits available for encoding the current and future frames is low. On the other hand, the switch from low resolution back to high resolution mode should be done only when there is certainty that this switch will not cause reversion to low resolution mode immediately in the future. Thus the objective functions used to make the decisions need to be significantly different. For example, additional parameters such as the scene-change history need to be considered when switching from low resolution to high resolution mode.

It is an object of the present invention to provide an improved method for dynamic resolution switching which uses an estimate of the motion to provide distortion masking and which avoids the problems of inaccurate statistical estimation and repeated switching of resolution modes. It is a further object of the present invention to provide an improved coding method, which determines encoding parameters after taking into account the resolution of the current and previous frames being encoded.

SUMMARY OF THE INVENTION

The present invention relates to a method, system and computer program product for the predictive encoding of a digital video bitstream by the use of dynamic resolution switching to ensure a good quality video reconstruction. Resolution switching, as the name suggests, implies changing the resolution of the output encoded video bitstream. Resolution change is provided by encoding the current frame at high resolution if the preceding frames were encoded at low resolution, or encoding the current frame at low resolution if the preceding frames were encoded at high resolution.

An embodiment of the present invention relates to a method for predictively encoding digital video sequences, wherein the method comprises the step of dynamically selecting the resolution of a current frame being encoded, the selection being based on statistical and coding information of a plurality of frames. Further, the selection step includes analyzing the statistical and coding information from at least one previous frame and the current frame, the statistical information including scene-change information and estimated motion information, and the coding information including a measure of the quantization used by the frames and a measure of the availability of bits. The method further comprises the step of selecting encoding parameters and encoding a current frame at a chosen resolution, wherein the selection procedure takes into account the output of the dynamic resolution selection step in determining the encoding parameters.

A further embodiment of the present invention relates to a system for the predictive encoding of digital video sequences. The system comprises a dynamic resolution switch controller means for the dynamic selection of the resolution of a current frame being encoded, wherein the selection is based on the statistical and coding information of a plurality of frames. Additionally included in the resolution analyses is the statistical and coding data from at least one previous frame and the current frame, the statistical information including scene-change information and estimated motion information, and the coding information including a measure of the quantization used by the frames and a measure of the availability of bits. Further, the system comprises a coder means for the selection of encoding parameters and encoding of a current frame at a chosen resolution, the coder means taking into account the output of the dynamic resolution switch controller means in determining the encoding parameters.

A yet further embodiment of the present invention relates to a computer program product for predictively encoding digital video sequences, comprising a computer-usable medium carrying thereon a means for dynamically selecting the resolution of the current frame being encoded, the selection being based on the statistical and coding information of a plurality of frames, including at least one previous frame and the current frame. The statistical information includes scene-change information and estimated motion information; the coding information additionally includes a measure of the quantization used by the frames and a measure of the availability of bits. Further, the computer program product comprises a means for selecting encoding parameters and encoding a current frame at a chosen resolution, the means taking into account the output of the means for dynamically selecting the resolution of the current frame being encoded in determining the encoding parameters.

Additional embodiments of the present invention may utilize coding information that includes a measure of the quantization used by the frames and a measure of the availability of bits, wherein the statistical and coding information is generated by a previous run of a coder means.

The objects, advantages and features of the present invention will become more apparent when reference is made to the following description taken in conjunction with the accompanying drawings.

BRIEF DESCRIPTION OF THE FIGURES

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

Embodiments of the invention are described below in detail. The disclosed embodiments are intended to be illustrative only, since numerous modifications and variations therein will be apparent to those of ordinary skill in the art. In reference to the drawings, like numbers will indicate like parts continuously throughout the views.

Figure 1:
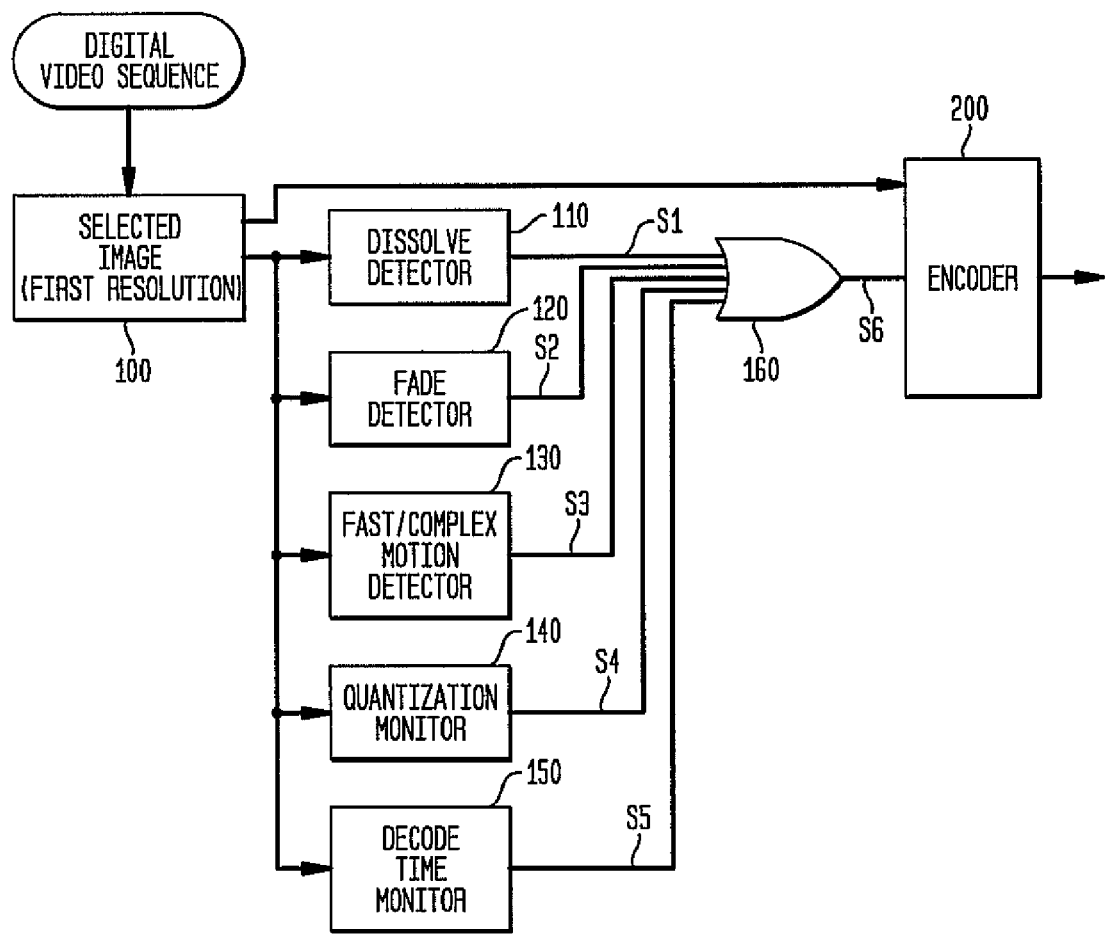
FIG. 1 is a diagram illustrating a prior-art encoding system for the selection of a resolution mode for encoding a particular image in a sequence of images.
Figure 2:
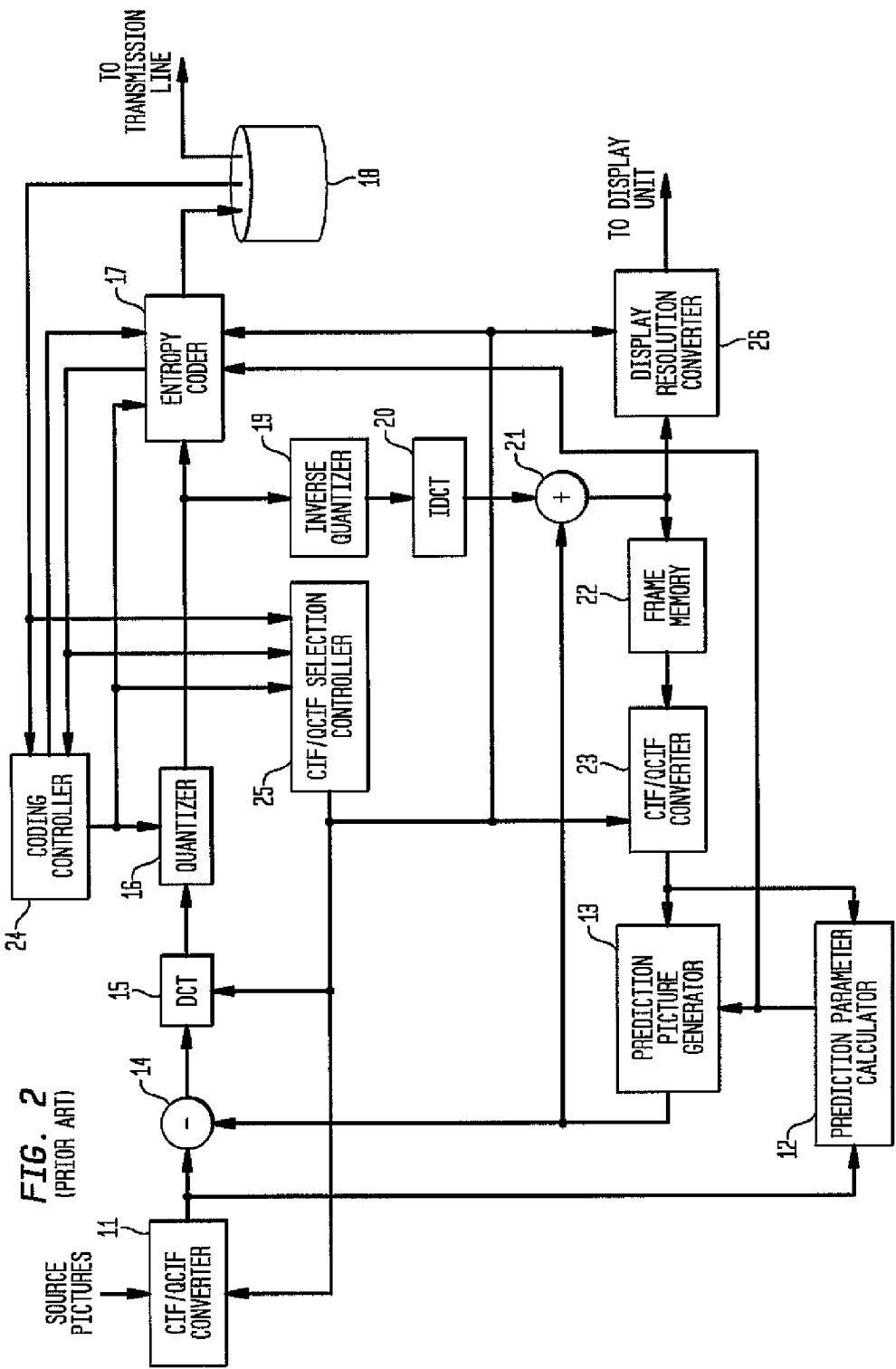
FIG. 2 is a diagram illustrating a prior-art encoding system for the selection of a resolution mode for encoding a particular frame in a digital video.
Figure 3:
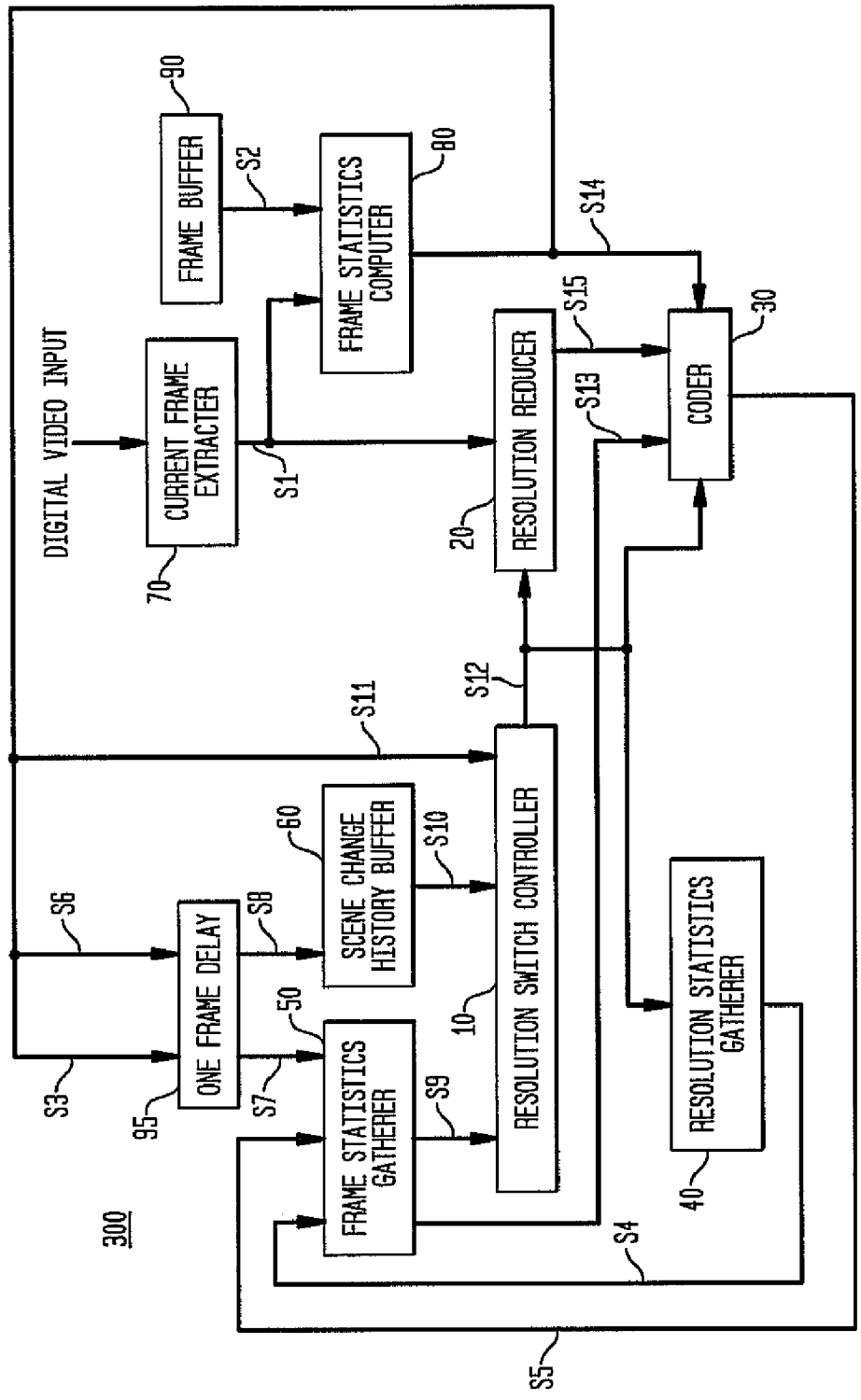
FIG. 3 is a diagram illustrating an embodiment of a system of the present invention.

The present invention is initially described in reference to FIG. 3. An exemplary embodiment of the present invention relates to a system for the predictive encoding of digital video sequences 300. The system 300 comprises a dynamic resolution switch controller means 10 for the dynamic selection of the resolution of a current frame being encoded, wherein the selection is based on the statistical and coding information of a plurality of frames. The current frame refers to the frame which is to be encoded next, that is, the frame whose encoding parameters are being determined at the current time interval.

Additionally included in the resolution analyses is the statistical and coding data from at least one previous frame and the current frame, the statistical information including scene-change information and estimated motion information, and the coding information including a measure of the quantization used by the frames and a measure of the availability of bits. Further, the system 300 comprises a coder means 30 for the selection of encoding parameters and encoding of a current frame at a chosen resolution, the coder means talking into account the output of the dynamic resolution switch controller means 10 in determining the encoding parameters.

The resolution switch controller means 10 uses one of two different methods to determine when the resolution of the output encoded video bitstream should be switched, depending on the resolution at which the video is being presently encoded. The critical factors in determining when to switch from high resolution to low resolution include the availability of bits (or the likelihood of decoder buffer underflow in the case of constant bitrate video), the expected magnitude of quantization scale required to prevent the overflow and the amount of motion present that can provide distortion masking for low resolution encoded video frames.

The critical factors in determining when to switch from low resolution to high resolution include the amount of masking motion present, the expected value of quantization scale if such a switch is made and the likelihood of oscillation if such a switch is made, that is, the likelihood that such a switch will need to be followed by reversion to low resolution mode in the near future. The likelihood of oscillation, in turn, depends on the decoder buffer level and the scene change statistics of the preceding frames. Accordingly, the different methods for resolution switching use the above-mentioned criteria as a basis for determining the resolution required for encoding, depending on whether the current resolution mode is high resolution mode or low resolution mode.

The presently described exemplary embodiment further provides for the regulation of the encoding parameters used by the coder means 30, based on the output of the resolution switch controller means 10. In particular, when the resolution switch controller means 10 determines a switch in resolution is required, the current frame is encoded as a scene change frame, inasmuch as non-predictive coding of the frame is favored over predictive coding. Further, the statistics of the current frame are assumed to be significantly different from the statistics of the preceding frames, and the quantization scale and bitrate allocated to the frame are accordingly computed. Further, the quantization scale and the bitrate allocated to the frame are lesser than the corresponding allocations to a 'true' scene change frame, that is, a scene change that is not caused by a resolution switch.

The embodiment of FIG. 3 additionally features a current frame extracter means 70 which extracts the current frame to be encoded from the input digital video. The output S1 of the means is applied to the frame statistics computer means 80 that computes the statistics of the current frame, including inter-pixel difference, the predicted quantization scale, and the motion estimate.

The frame statistics computer means 80 determines if the current frame is suitably different from the previous frame as to mark a scene change. To enable the determination, the frame buffer means 90 stores one or more preceding frames and the output signal S2 of the frame buffer means 90 is applied to the frame statistics computer means 80.

The frame statistic gatherer means 50 gathers the statistics of a plurality of preceding frames. The statistics include the motion estimates, the decoder buffer level, the inter-pixel differences and the quantization scales used for encoding a plurality of preceding frames. The input signals applied to the frame statistics gatherer means 50 include the output signal S7 from the delay latch means 95, the output signal S4 from the resolution statistics gatherer means 40, and the output signal S5 from the coder means 30.

The output signal S7 is generated by delaying the output signal S3 from frame statistics computer means 80 by the duration of one frame. The signal S3 carries statistics from frame statistics computer means 80, including the motion estimate of the current frame and the value of the inter-pixel difference for the current frame. The aforementioned output signal S4 carries the resolution statistics gathered by the resolution statistics gatherer means 40, including the resolutions at which a plurality of preceding frames was encoded. The output signal S5 carries the coded statistics from the coder means 30 including the quantization scales used to encode a plurality of preceding frames and the decoder buffer level. The scene-change history buffer means 60 stores the frame numbers for a plurality of preceding frames which marked scene changes. The output signal S6 from frame statistics computer means 80 carries the scene change information for the current frame. The output signal S6 is applied to the delay latch means 95, and the resultant delayed output signal S8 is applied to the scene-change history buffer means 60.

As described above, the resolution switch controller means 10 selects the resolution at which the current video frame should be encoded. The inputs applied to the resolution switch controller means 10 are the output signal S9 from the frame statistic gatherer means 50, the output signal S10 from the scene-change history buffer means 60 and the output signal S11 from the frame statistics computer means 80. The fore mentioned output signal S9 carries the statistics for a plurality of preceding frames, including motion estimates, quantization scales used for encoding, resolution statistics and the decoder buffer level. The output signal S10 carries the scene-change statistics, namely the frame numbers at which preceding scene-changes occurred.

In an exemplary embodiment the output signal S10 may simply carry the frame number at which the immediately preceding scene-change occurred (or equivalently, the frame number at which the current scene started). In an alternative embodiment, the signal may contain information about multiple preceding scene-changes, such that gradual scene-change effects (such as wipes and fades) can be detected and used by the resolution switch controller. The output signal S11 carries the frame statistics for the current frame from the frame statistics computer means 80, including the motion estimate and the predicted quantization scale for the current frame. The statistical information contained in signal S11 differs from that in signal S9, in that signal S11 contains statistical information for the current frame. Since the frame statistics gatherer means 50 only receives the current frame statistical information (via signal S7) after the delay of one frame duration (which delay is induced by the delay latch means 95), signal S9 only contains statistical information for preceding frames.

On the basis of the abovementioned-received statistics, the resolution switch controller 10 determines the advisability of switching the resolution (from high to low resolution, or from low to high resolution) of the output encoded video stream. The decision of the resolution switch controller 10 is communicated via output signal S12 to the resolution reduction means 20, the coder means 30 and the resolution statistic gatherer means 40. In the event that the output video stream has to be encoded at a low resolution, the resolution reduction means 20 reduces the resolution of the current frame through a process of filtering and sub-sampling. An exemplary embodiment of the process is to use an n*n averaging mask (where n is a constant integer) at each pixel of the current frame and to then down-sample the resultant frame by a factor of n in both vertical and horizontal dimensions.

Resolution reduction is required in two cases. The first case is when the immediately preceding frame was encoded at a low resolution and the resolution switch controller determines that a resolution switch is not required. The second case is when the immediately preceding frame was encoded at a high resolution and the resolution switch controller determines that a resolution switch is required. In the case when the current frame is to be encoded at its original resolution, the resolution reduction means 20 simply allows the frame to pass through unchanged.

The coder means 30 determines the parameters to be used in encoding the current frame, including the quantization scales, and performs the actual encoding of the frame. The input signals applied to the means are the output signal S12 from the resolution switch controller 10, the output signal S13 from frame statistics gatherer means 50, the output signal S15 from resolution reduction means 20 and the output signal S14 from the frame statistics computer means 80. The aforementioned output signal S12 contains the resolution switch decision determined by the resolution switch controller 10.

As mentioned before, it is significant if the difference in the statistics of frames are at different resolutions (even if the frames are otherwise similar), hence if the resolution of the current frame is different from the immediately preceding frame the coding means should make suitable selections of the encoding parameters. An exemplary embodiment of the selection is to consider a resolution switch to be a 'resolution scene-change', and to code the current frame non-predictively in the above scenario.

Further, since the 'resolution scene-change' may not be a 'true' scene change (in that the frames may be similar at their original resolutions), the bit allocation and the quantizer scale selection should be lower than the corresponding selections in the event of a 'true' scene-change (that is, a scene change not caused by a change in resolution). The dependence of the coding means on the resolution switch decision is an important advantage of the present invention.

The output signal S13 carries the statistical information of a plurality of preceding frames from the frame statistics gatherer means 50. The aforementioned output signal S15 carries the frame output of the resolution reduction means 20, this may either be the original current frame or it may be the current frame at a reduced resolution. The aforementioned output signal S14 carries the statistical information of the current frame from the frame statistics computer means 80. The coder means 30 makes a prudent selection of the encoding parameters by utilizing the information contained in the above signals and then encodes the current frames using the encoding parameters. The output of the coder means 30 is the encoded digital video bitstream.

Figure 3A:
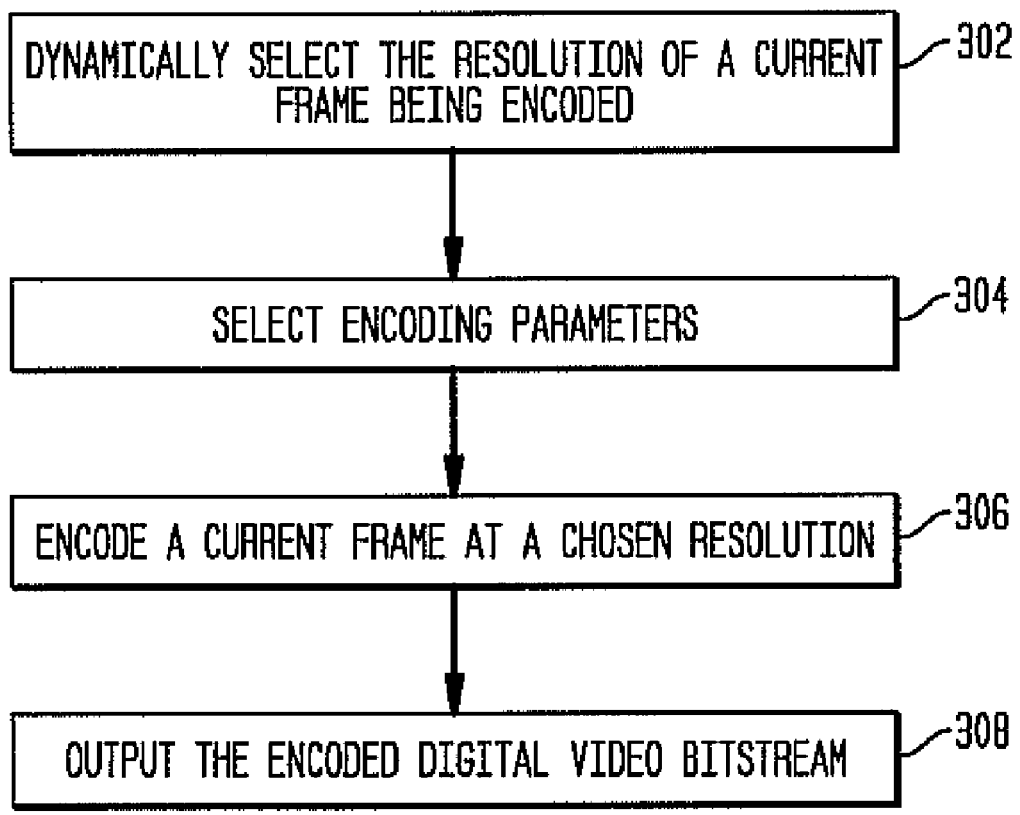
FIG. 3A is a flow diagram illustrating a method for predictively encoding digital video sequences.

FIG. 3A illustrates a further embodiment of the present invention that relates to a method for predictively encoding digital video sequences, wherein the method comprises the step 302 of dynamically selecting the resolution of a current frame being encoded, the selection being based on statistical and coding information of a plurality of frames. Further, the selection step includes analyzing the statistical and coding information from at least one previous frame and the current frame, the statistical information including scene-change information and estimated motion information, and the coding information including a measure of the quantization used by the frames and a measure of the availability of bits. The method further comprises the step 304 of selecting encoding parameters and at step 306 encoding a current frame at a chosen resolution, wherein the selection procedure takes into account the output of the dynamic resolution selection step in determining the encoding parameters. Finally, a step 308 the method outputs an encoded digital video bitstream.

A yet further embodiment of the present invention relates to a computer program product for predictively encoding digital video sequences, comprising a computer-usable medium carrying thereon the means for dynamically selecting the resolution of the current frame being encoded, the selection being based on the statistical and coding information of a plurality of frames, including at least one previous frame and the current frame. The statistical information includes scene-change information and estimated motion information, wherein, the coding information includes a measure of the quantization used by the frames and a measure of the availability of bits. Further, the computer program product comprises a means for selecting encoding parameters and encoding a current frame at a chosen resolution, the means taking into account the output of the means for dynamically selecting the resolution of the current frame being encoded in determining the encoding parameters.

Figure 4:
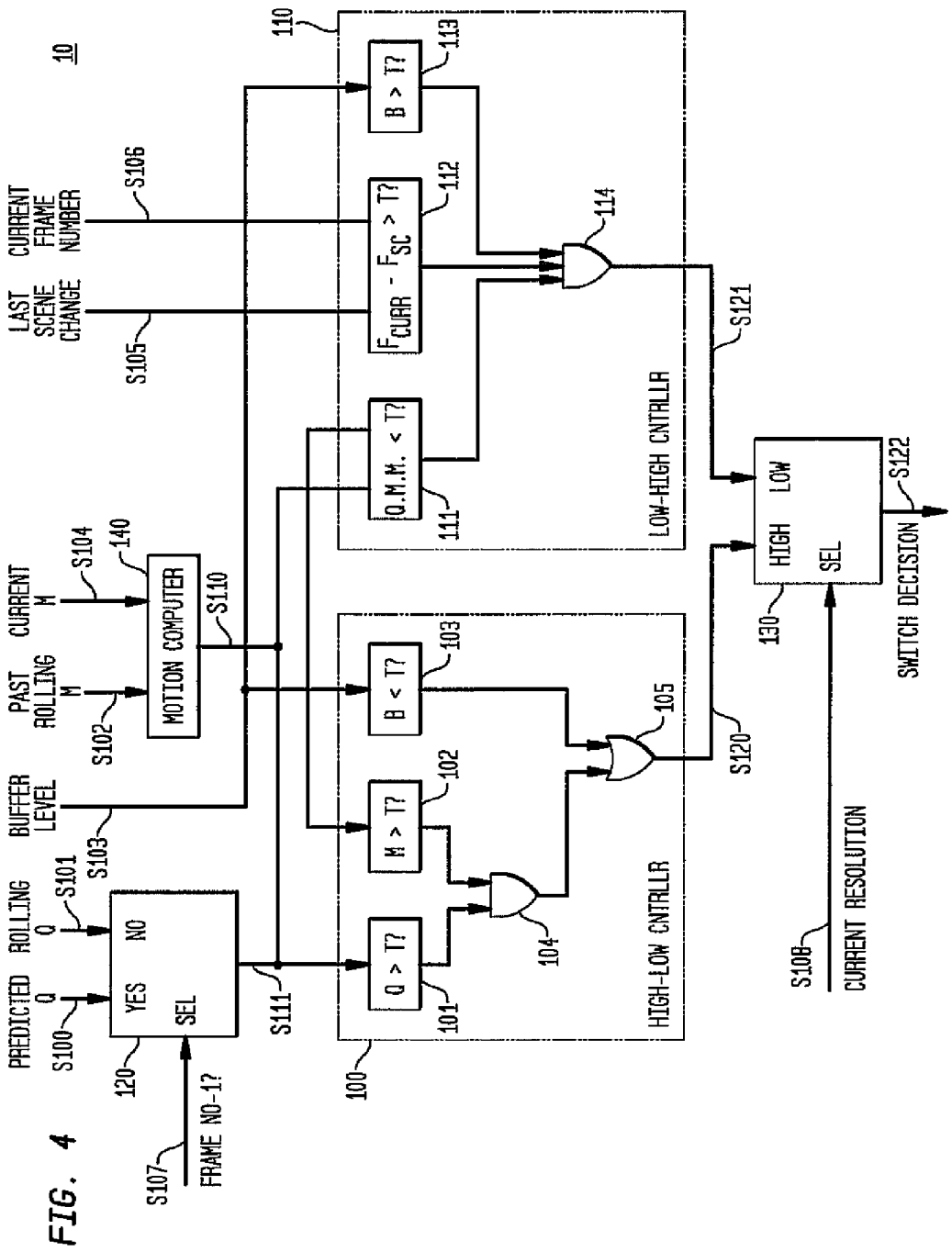
FIG. 4 is a diagram illustrating the operation of an embodiment of the resolution switch controller.

FIG. 4 illustrates an exemplary embodiment of the resolution switch controller 10 that may be utilized within the present invention. The input signals and statistics utilized by the resolution switch controller 10 for determining whether a switch in resolution is required, in the preferred embodiment are as follows: Input signal S100 carries the predicted value of the quantization scale for the current frame from the frame statistics computer 80. The signal S101 carries a value, from the frame statistic gatherer 50, which is a measure of the quantization scales used to encode a plurality of preceding frames. For example, the value can be generated by computing a rolling average of the quantization scales used to encode the preceding frames. Signal S102 carries a value, from the frame statistic gatherer 50, which is a measure of the amount of motion in a plurality of preceding frames. The value can be generated by computing a function dependent on the rolling average of the motion vector magnitudes and the energy of the residual obtained by differencing each frame from the motion compensated previous frame. Signal S103 carries information regarding the decoder buffer level, from the frame statistic gatherer 50. Signal S104 carries an estimate of the motion in the current frame, from the frame statistic computer 80. Signal S105 carries the frame numbers of one or more preceding frames which marked scene-changes, wherein the frame-number of only that frame which marked the latest scene-change is used. Signal S106 carries the frame number of the current frame. Signal S107 is a binary signal, which is set high if the current frame number is equal to one and is set low otherwise. The signals S106 and S107 can be generated by the frame statistic computer 80. The signals S106 and S107 can also be generated by a separate frame counter. Signal S108 is a binary signal, which is set high if the resolution used to encode the immediately preceding frame was high and is set low otherwise. In the present embodiment, signal S108 is generated by the resolution statistics gatherer 40.

The input binary signal S107 is applied to the multiplexer 120 to select between signals S100 and S101. Thus if the frame number of the current frame is equal to 1, that is, if the current frame is the first frame being encoded, the output signal S111 of the multiplexer 120 is set to the predicted quantizer scale value signal S100. If the predicted quantizer scale value for the first frame is inordinately high, it may be anticipated that the coding complexity of the video will be high, and hence it is better to start coding at a low resolution. This solves the problem created by not having a statistical history to refer to, while coding the first frame. If the current frame is not the first frame being encoded the output of the multiplexer 120 is set to the value signal S101, which is computed on the basis of the quantization scale values of a plurality of preceding frames.

The input signals S102 and S104 are applied to the motion computer 140. The motion computer 140 combines the values carried by signal S102 (motion estimate of preceding frames) and signal S104 (motion estimate of current frame) and generates a new motion estimate, which thereby combines the motion estimates of the preceding frames as well as the current frame. Since the new motion estimate takes the motion of the current frame into account, it is more representative of the current motion characteristics of the video sequence than a measure based only on preceding frames. At the same time, since the estimate also takes into account the motion statistics of a plurality of preceding frames, it is less likely to be rendered inaccurate by short-lived temporal disturbances (such as random noise) in the video stream. The motion estimate is carried by output signal S110.

The high-to-low switch controller 100 implements the decision of switching the resolution from high resolution to low resolution. In the preferred embodiment the high-to-low switch controller 100 consists of three comparators 101, 102 and 103, as shown in FIG. 4, AND gate 104 and the OR gate 105. The inputs to the high-to-low switch controller 100 are the signals S111, S103 and S110. The comparator 101 compares the quantization scale estimate Q, available on signal S111, to a predetermined threshold $T_Q$ and it's output is set high if $Q > T_Q$. The comparator 102 compares the motion estimate M, available on signal S110, to a predetermined threshold $T_M$ and it's output is set high if $M > T_M$. The comparator 103 compares the decoder buffer level $B_{dec}$, available on signal S103, to a predetermined threshold $T_B$ and it's output is set high if $B_{dec} < T_B$. The outputs of comparators 101 and 102 are passed through the AND gate 104 and the result is ORed with the output of comparator 103. The output signal S120 of the OR gate 105 signifies the decision taken by the high-to-low switch controller, If the output is high, the resolution should be switched from high resolution to low resolution. Thus, in the preferred embodiment the high-to-low switch controller implements the following criterion switch from high resolution to low resolution if the following condition $C_1$ evaluates to true.

$$C_1 = \{\{Q > T_Q\} \&\& \{M > T_M\}\} || \{B_{dec} < T_B\}$$

$C_1$ will be true if either the decoder buffer level is dangerously low or if both the quantization scale and the amount of motion are high. This reflects the relationship between quantization distortion (caused by encoding at high quantization scale), blurring distortion (caused by encoding at low resolution) and motion-blurring distortion is preferable to quantization distortion if the motion is high enough to mask the effects of blurring distortion.

Hence, if the quantization distortion is very high, it is advisable to switch to low resolution but only if the amount of motion is high enough to mask the resultant blurring distortion. However, in the event that the decoder buffer level is very low, it is better to switch to low resolution regardless of the motion and quantization, since a decoder buffer underflow causes far more severe distortion effects than either of the abovementioned distortions.

The low-to-high switch controller 110 implements the decision of switching the resolution from low resolution to high resolution. The low-to-high switch controller 110 consists of three comparators 111, 112 and 113 and the AND gate 114. The inputs to the low-to-high switch controller 110 are the signals S111, S103, S105, S106 and S110. The comparator 111 computes the function $Q.M^2$, where Q and M are as aforementioned, and compares the value of this function to a preset threshold $T_{QM}$ and sets it's output high if $Q.M z < T_Q$. The comparator 112 compares the current frame number, which information is available on S106, with the frame number at which the last scene change occurred, which information is available on S105. The output of the comparator 112 is set high if $F_{curr} - F_{sc} > T_{sc}$, where $F_{curr}$ refers to the frame number of the current frame, $F_{sc}$ refers to the frame number at which the last scene change occurred and $T_{sc}$ refers to a fixed preset threshold. The comparator 113 compares the decoder buffer level $B_{dec}$, available on S103, to a predetermined threshold $T_{B2}$ and it's output is set high if $B_{dec} > T_{B2}$ The outputs of comparators 111, 112 and 113 are passed through the AND gate 114. The output S121 of gate 114 signifies the decision taken by the low-to-high switch controller 110. If the output is high, the resolution is to be switched from low resolution to high resolution. The low-to-high switch controller 110 implements a switch from low resolution to high resolution if the following condition C2 evaluates to true.

$$C_2 = \{Q.M^2 > T_{QM}\} \&\& \{B_{dec} > T_{B2}\} \&\& \{F_{curr} - F_{sc} > T_{sc}\}$$

$C_2$ is a significantly different criterion from $C_1$. As noted before, this is because the motivation for switching from low-resolution to high-resolution mode fundamentally differs from the motivation for doing the inverse operation. When deciding to switch from low-resolution to high resolution mode, it is of primary importance to ensure that a persistent high-resolution mode will be achieved so that subsequently it will not be required to revert back to low-resolution mode. Hence, the decision is only taken if every individual statistic considered indicates that encoding in high-resolution mode can be sustained, at least for the foreseeable future. A low value of the function $Q.M^2$ indicates that the quantization scale and motion estimates are both low.

Low values of the statistics indicate that it is preferable to coding at high resolution. The reason $Q.M^2$ is preferred to the product $Q.M$ is that the motion estimate is typically found to be a more reliable and accurate parameter on which to base a resolution switch decision. A high value of $B_{dec}$ indicates that the decoder buffer level is sufficiently high, such that coding at high resolution will not deplete the decoder buffer level to dangerously low levels in the near future. Finally, a high value of $F_{curr} - F_{sc}$ indicates that a sufficient amount of time has passed since the last scene change.

This is required because gradual scene-changes often occur over several frames and the frames typically require a large amount of bits to encode. As such, it is inadvisable to switch out of low-resolution mode during the frames, because of the danger of quick reversion back to low-resolution mode.

The condition $C_2$ therefore requires that the product $Q.M^2$ be low and that the decoder buffer level be sufficiently high and that a sufficient amount of time have elapsed since the last scene-change occurred. By themselves, any one of the three comparisons is not enough to ensure persistence of a high-resolution mode if a switch is effected. However, if all three comparisons hold, it is reasonable assumption that a persistent high-resolution mode can be achieved if a switch is effected.

The signals S120 and S121 are applied to the multiplexer 130, which is controlled by the binary input signal S108. When S108 set high, that is if the resolution used to encode the immediately preceding frame was high, then the signal S120 appears on the output S122 of the multiplexer 130.

Conversely when S108 is set low, that is if the resolution used to encode the immediately preceding frame was low, then the signal S121 appears on the output of the multiplexer 130. The output S122 is the final output of the resolution switch controller 10. When the output is high the resolution at which the video stream is being encoded is to be switched, that is, if the resolution of the preceding frame was high, then the resolution of the current frame will be low and vice versa.

Figure 5:
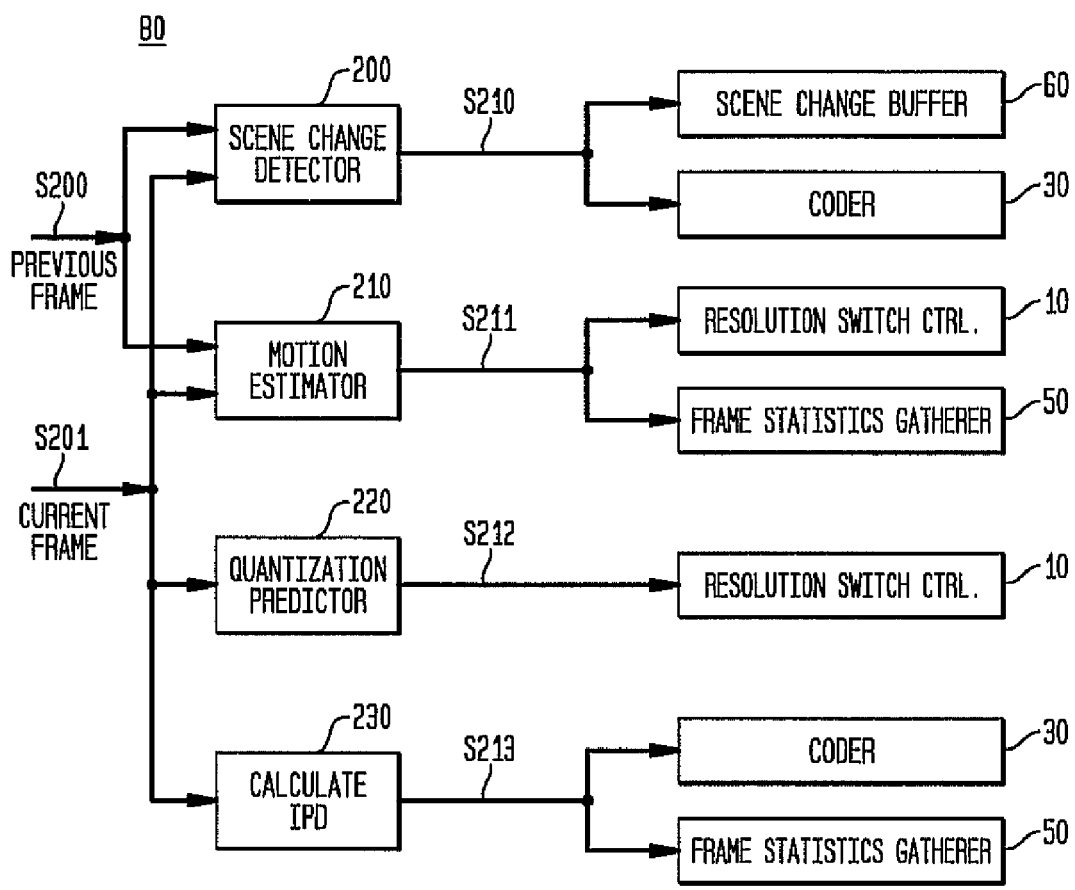
FIG. 5 is a flow diagram illustrating the operation of an embodiment of the frame statistic computer.

FIG. 5 shows an exemplary embodiment of the frame statistic computer means 80. The inputs applied to the frame statistic computer means 80 are the input signals S200 and S201. The input signal S200 carries the current frame from the current frame extracter means 70. The input signal S201 carries a previous frame from the frame buffer means 90. The exemplary embodiment of the frame statistic computer means 80 incorporates a scene change detector means 200 to which the signals S200 and S201 are applied. The scene change detector means 200 determines if the current frame marks a scene-change by comparing its statistics, including the frame mean and inter-pixel difference, to the corresponding statistics of the previous frame.

The output S210 of the scene change detector means 200 is applied to the scene-change history buffer 60 and the coder means 30. The embodiment of the frame statistic computer 80 further incorporates a motion estimator means 210 to which the signals S200 and S201 are applied. The motion estimator means 210 computes an estimate of the motion between the previous frame and the current frame by examining motion statistics including the energy of the motion-compensated residual. The output S210 of the motion estimator means 210 is applied to the resolution switch controller means 10 and the frame statistic gatherer means 50. The frame statistic computer 80 further incorporates a quantization scale predictor means 220 to which the signals S200 and S201 are applied. The quantization scale predictor means 220 estimates the expected quantization scale that will be needed to code the current frame, which estimate is based on current and previous frame statistics, including the frame complexity of the previous and current frames and the number of bits required to code the previous frame. The estimate is output via signal S212 and is applied to the resolution switch controller 10 to be used in determining the encoding resolution as discussed above.

The frame statistic computer 80 further incorporates an inter-pixel difference computer means 230 to which the signal S200 is applied. The inter-pixel difference computer means 230 computes the average inter-pixel difference for the current frame and outputs the statistic via signal S213 to the coder means 30 and the frame statistic gatherer means 50.

As an alternative, the exemplary embodiment can utilize the statistics of a plurality of previous frames (wherein the statistics are available at the frame statistic gatherer) to estimate the predicted quantization scale and implement the scene-change detection. In addition, the alternative embodiment can compute additional statistics, including the variance of the current frame, and transmit these statistics to the coder means 30 and the resolution switch controller 10 for utilization in encoding.

Figure 6:
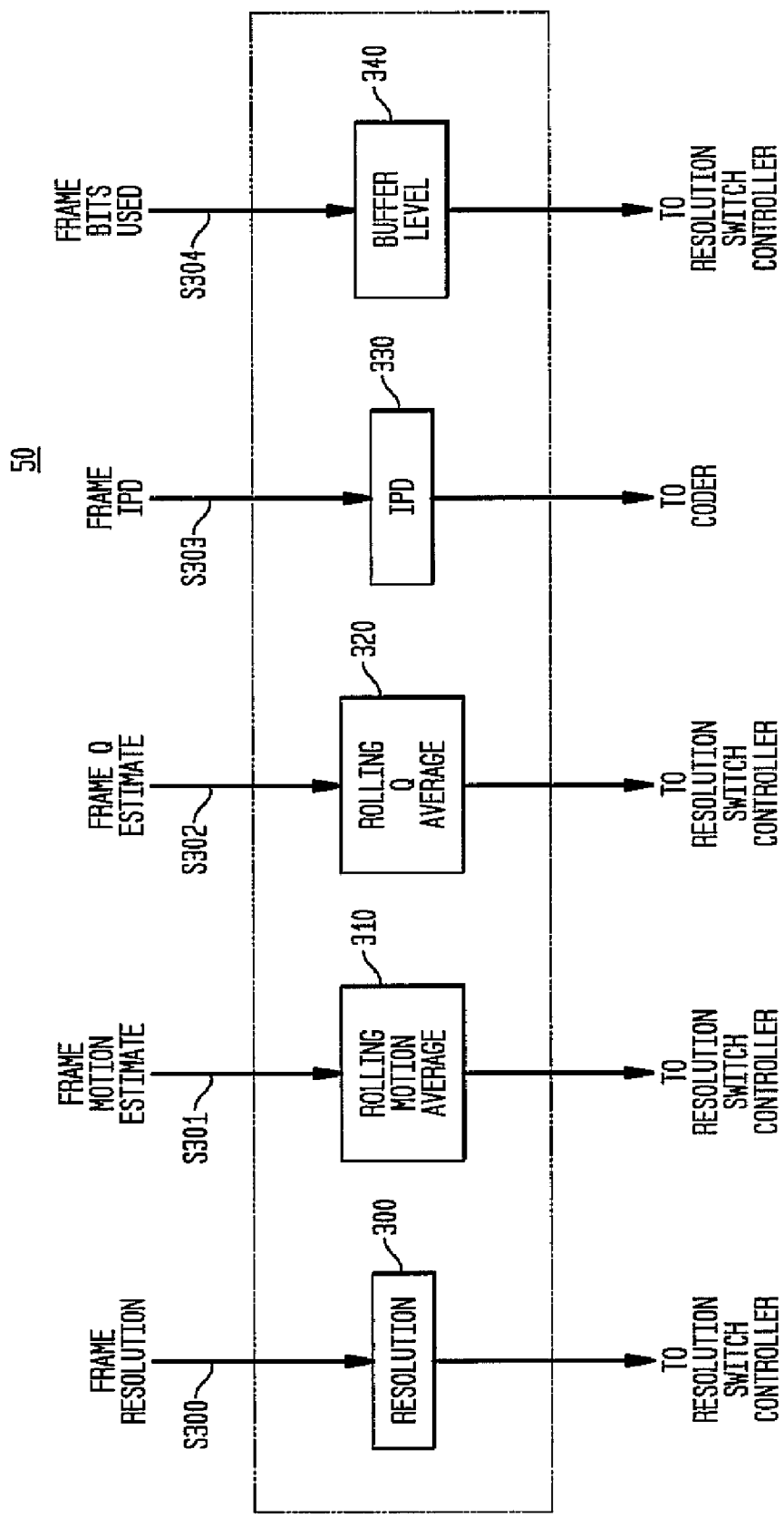
FIG. 6 is a flow diagram illustrating the operation of an embodiment of the frame statistic gatherer.

FIG. 6 shows an exemplary embodiment of the frame statistic gatherer means 50. Prior to encoding the current frame, the frame statistics of the frame are carried to a delay latch, which delays the statistics by one frame duration before transmitting them to the frame statistic gatherer means 50. Further, immediately after the current frame has been encoded the encoding parameters of the frame are applied directly to the frame statistic gatherer means 50. This is done immediately prior to encoding the next frame. Hence, the input signals to the frame statistic gatherer means 50 carry information about the frame statistics and the encoding parameters of the last encoded frame.

The statistical information is processed by the frame statistics gatherer 50 and is transmitted to the resolution switch controller 10 and the coder means 30 to be used as a-priori information in determining the encoding resolution and encoding parameters. In the exemplary embodiment, the input to the frame statistic gatherer means 50 are the input signals S300, S301, S302, S303 and S304. Signal S300 carries information on the resolution at which the previous frame was encoded. This information is generated by the resolution statistics gatherer means 40. Signals S301 and S303 carry information on the motion estimate of the previous frame and the mean inter-pixel difference of the previous frame respectively. Both these signals are originally generated by the frame statistic computer and pass through the delay latch before being applied to the statistic gatherer. The motion information carried on S301 is utilized by the rolling motion average means 310 to generate a new value of the rolling motion average.

Finally, signals S302 and S304 carry information about the encoding parameters used to encode the last encoded frame, namely the average quantization scale used to encode the frame and the number of bits used to encode the frame respectively. The signals are generated by the coder means 30 and are directly applied to the frame statistics gatherer 50. The information on the signal S302 is used to compute a new value of the rolling average by the rolling Q average means 320. The information on the signal S304 is used to compute the new decoder buffer level by the buffer level means 340.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for predictively encoding digital video sequences, comprising:
   a dynamic resolution switch controller means for dynamically selecting the resolution of the current frame being encoded, the selection being based on the statistical and coding information of a plurality of frames; and,
   a coder means for selecting encoding parameters and encoding the current frame at a chosen resolution, the coder means taking into account the output of the dynamic resolution switch controller means in determining the encoding parameters, wherein the dynamic resolution switch controller means further utilizes at least one previous frame and the current frame, the statistical information including scene-change information and estimated motion information, and the coding information including a measure of the quantization used by the frames and a measure of the availability of bits, wherein the dynamic resolution is further based on functional conditions based on the statistical and coding information, on the basis of which the resolution selection is performed are different for a low-to-high resolution switch as compared to a high-to-low resolution switch, wherein the functional criteria evaluated for determining if a low-to-high resolution switch be affected is given by the following condition, the switch being affected if the condition $C_2$ evaluates to TRUE $$C_2 = \{Q.M^2 > T_{QM}\} \text{ AND } \{B_{dec} > T_{B2}\} \text{ AND } \{F_{curr} - F_{SC} > T_{SC}\}$$

where Q is a measure of the quantization scales used to encode a plurality of previous frames, M is a measure of the motion present in a plurality of previous frames and the current frame, $B_{dec}$ is a measure of the decoder buffer fullness, $F_{curr}$ and $F_{sc}$ are the frame numbers of the current frame and the last scene-change frame respectively and $T_{QM}$, $T_{B2}$ and $T_{SC}$ are preset thresholds.

2. The system of claim 1, wherein the decoder buffer fullness is determined by the measure of the availability of bits.

3. The system of claim 2, wherein the coder means receives the output of the resolution switch controller means by coding the current frame non-predictively if the resolution switch controller means determines that the current frame be coded at a different resolution than the immediately preceding frame.

4. The system of claim 2, wherein the coder means receives the output of the resolution switch controller means by coding the current frame in a combined predictive and non-predictive fashion, with non-predictive coding favored, the decision between predictive and non-predictive coding taken on the basis of frame statistics for a plurality of previous frames and the current frame, if the resolution switch controller means determines that the current frame be coded at a different resolution than the immediately preceding frame.

5. The system of claim 4, wherein the statistics include an estimate of the motion, the estimate being based on motion information including the energy of the motion-compensated residual of the current frame.

6. The system of claim 1, wherein the functional criteria evaluated for determining if a high-to-low resolution switch be affected is given by the following condition, the switch being affected if the condition $C_1$ evaluates to TRUE $$C_1 = \{\{Q > T_Q\} \text{ AND } \{M > T_M\}\} \text{ OR } \{B_{dec} < T_B\}$$

where Q is a measure of the quantization scales used to encode a plurality of previous frames, M is a measure of the motion present in a plurality of previous frames and the current frame, $B_{dec}$ is a measure of the decoder buffer fullness and $T_Q$, $T_M$ and $T_B$ are preset thresholds.

7. The system of claim 6, wherein the quantization measure is based on a rolling average of the quantization scales of a plurality of previous frames and the predicted quantization scale of the current frame.

8. The system of claim 6, wherein the quantization measure is based on a rolling average of the quantization scales of a plurality of previous frames, further, the motion estimate is based on the rolling average of the motion measure of an individual frame, the measure being based on the energy of the motion-compensated residual of the frame and the motion vector magnitudes for the frame.

9. The system of claim 1, wherein the quantization measure is based on a rolling average of the quantization scales of a plurality of previous frames and the predicted quantization scale of the current frame.

10. The system of claim 1, wherein the quantization measure is based on a rolling average of the quantization scales of a plurality of previous frames, further, the motion estimate is based on the rolling average of the motion measure of an individual frame, the measure being based on the energy of the motion-compensated residual of the frame and the motion vector magnitudes for the frame.

11. A non-transitory computer readable medium encoded with computer executable instructions for predictively encoding digital video sequences, said set of computer executable instructions comprising:

a computer readable means for dynamically selecting the resolution of the current frame being encoded, the selection being based on the statistical and coding information of a plurality of frames, including at least one previous frame and the current frame;

a computer readable means for selecting encoding parameters and encoding a current frame at a chosen resolution, the means taking into account the output of the means for dynamically selecting the resolution of the current frame being encoded in determining the encoding parameters, wherein the statistical information includes scene-change information and estimated motion information, and the coding information includes a measure of the quantization used by the frames and a measure of the availability of bits, and, wherein the dynamic resolution is further based on functional conditions based on the statistical and coding information, on the basis of which the resolution selection is performed are different for a low-to-high resolution switch as compared to a high-to-low resolution switch, the method further comprising:

determining if a low-to-high resolution switch being affected is given by the following condition, the switch being affected if the condition $C_2$ evaluates to TRUE $$C_2 = \{Q.M^2 > T_{QM}\} \text{ AND } \{B_{dec} > T_{B2}\} \text{ AND } \{F_{curr} - F_{sc} > T_{sc}\}$$

where Q is a measure of the quantization scales used to encode a plurality of previous frames, M is a measure of the motion present in a plurality of previous frames and the current frame, $B_{dec}$ is a measure of the decoder buffer fullness, where $F_{curr}$ and $F_{sc}$ are the frame numbers of the current frame and the last scene-change frame respectively and $T_{QM}$, $T_{B2}$ and $T_{SC}$ are preset thresholds.

12. The non-transitory computer readable medium encoded with computer executable instructions of claim 11, wherein the statistical information includes scene-change information and estimated motion information, and the coding information includes a measure of the quantization used by the frames and a measure of the availability of bits.

13. The non-transitory computer readable medium encoded with computer executable instructions of claim 11, wherein the means for dynamically selecting the resolution of the current frame being encoded further includes the step of the statistical and coding information being generated by a previous execution of the means for selecting encoding parameters and encoding the current frame at a chosen resolution.

14. The system of claim 1, wherein the scene-change detection is based on the inter-pixel difference and frame mean of two successive frames.

* * * * *